United States Patent
Park et al.

(10) Patent No.: US 8,311,081 B2
(45) Date of Patent: Nov. 13, 2012

(54) FRAME SYNCHRONIZATION METHOD AND RECEIVER FOR COMMUNICATION MODEM USING THE SAME

(75) Inventors: Ki Hyuk Park, Daejeon (KR); Bon Tae Koo, Daejeon (KR); Nak Woong Eum, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 387 days.

(21) Appl. No.: 12/629,014

(22) Filed: Dec. 1, 2009

(65) Prior Publication Data

US 2010/0135362 A1  Jun. 3, 2010

(30) Foreign Application Priority Data

Dec. 2, 2008 (KR) .................. 10-2008-0121255
Mar. 26, 2009 (KR) .................. 10-2009-0025866

(51) Int. Cl.
*H04B 1/707* (2006.01)
(52) U.S. Cl. ...................... 375/149; 375/150
(58) Field of Classification Search .............. 375/142, 375/143, 145, 147, 149, 150, 152, 260, 354, 375/365, 367, 369; 370/350, 509, 510, 512, 370/515
See application file for complete search history.

(56) References Cited

U.S. PATENT DOCUMENTS

| 6,430,171 | B1 * | 8/2002 | Ogami et al. ............. 370/342 |
| 2006/0093021 | A1 | 5/2006 | Kang et al. |
| 2006/0126491 | A1 * | 6/2006 | Ro et al. .................. 370/208 |
| 2008/0101516 | A1 | 5/2008 | Cho et al. |
| 2008/0107200 | A1 | 5/2008 | Zhu et al. |
| 2008/0144756 | A1 | 6/2008 | Park et al. |

FOREIGN PATENT DOCUMENTS

| JP | 2005-348007 A | 12/2005 |
| JP | 2008-228148 A | 9/2008 |
| KR | 10-2000-0014098 A | 3/2000 |
| KR | 10-2000-0056556 A | 9/2000 |
| KR | 10-2006-0003670 A | 1/2006 |
| KR | 10-0770426 B1 | 10/2007 |
| KR | 10-0809020 B1 | 3/2008 |

* cited by examiner

*Primary Examiner* — Young T. Tse

(57) ABSTRACT

Disclosed are a frame synchronization method and a receiver for a communication modem using the same. The frame synchronization method includes performing a correlation operation between a reception data stream and a preamble to output a synchronous signal; and computing correlation values between spreading codes and a reception data stream synchronized with the synchronous signal, wherein a maximum value of the computed correlation values is compared with a preset threshold value, and the outputting of the synchronous signal is performed again when the maximum value is smaller than the preset threshold value.

7 Claims, 4 Drawing Sheets

FRAME SYNCHRONIZATION METHOD AND RECEIVER FOR COMMUNICATION MODEM USING THE SAME

CROSS-REFERENCE TO RELATED APPLICATIONS

This application claims the priorities of Korean Patent Application No. 10-2008-0121255 filed on Dec. 2, 2008 and Korean Patent Application No. 10-2009-0025866 filed on Mar. 26, 2009, in the Korean Intellectual Property Office, the disclosure of which is incorporated herein by reference.

BACKGROUND OF THE INVENTION

1. Field of the Invention

The present invention relates to a frame synchronization method, and more particularly, to a frame synchronization method which can reduce operation quantity required for frame synchronization by stopping a correlation operation, which is performed by a frame synchronizer to check for synchronization failures (out-of-sync) after the acquisition of frame synchronization, and re-starting frame synchronization upon detecting the out-of-sync state of frames using a correlation value from a despreader, and a receiver for a communication modem using the same.

2. Description of the Related Art

Transceivers for common communication modems embed data with a specific pattern and a fixed length in a packet stream as a synchronous signal and transmit it, so that receivers can recognize frame boundaries between packets.

The synchronous signal is located at the beginning of a packet in general and is thus referred to as a header. A receiver determines the start position of a packet frame by looking up a synchronous pattern corresponding to a packet header in a received bit stream. Based on the determination result, the receiver interprets the received frame to be the same as a frame structure when it was transmitted, thereby restoring original information transmitted.

FIG. 1 illustrates a transceiver for a communication modem, which receives and transmits data according to the related art spreading method.

Referring to FIG. 1, a transmitter 110 includes a serial-to-parallel converter (S/P) 112, a spreading code generator 114, and a preamble generator 116. A receiver 140 includes an analog front end (AFE) 142, a frame synchronizer 114, and a despreader 146.

The S/P 112 determines the number of bits used to select a spreading code for transmission (Tx) data Tx_data. The spreading code generator 114 selects and outputs a spreading code according to the input.

A multiplexer (MUX) 120 combines a preamble output from the preamble generator 116 and the selected spreading code into reception (Rx) data and transmits it. The reception data is distorted while passing through a communication channel 130, and is input to the receiver 140 with noise inserted therein.

The AFE 142 performs clock synchronization on the input reception data, and compensates for distortions and removes noise through filtering. The frame synchronizer 144 estimates an accurate preamble location in the input reception data stream, and the despreader 146 despreads the reception data to restore transmission data TX_data'.

However, despite the presence of the synchronous signal, the related frame synchronizer 144 performs correlation operations continuously in order to monitor the out-of-sync state of frames, thereby undesirably increasing operation quantity and system load.

SUMMARY OF THE INVENTION

An aspect of the present invention provides a frame synchronization method capable of reducing the operation quantity of a frame synchronizer, and a receiver for a communication modem using the same.

According to an aspect of the present invention, there is provided a frame synchronization method including: performing a correlation operation between a reception data stream and a preamble to output a synchronous signal; and computing correlation values between spreading codes and a reception data stream synchronized with the synchronous signal, wherein a maximum value of the computed correlation values is compared with a preset threshold value, and the outputting of the synchronous signal is performed again when the maximum value is smaller than the preset threshold value.

According to another aspect of the present invention, there is provided a receiver for a communication modem, the receiver including: a frame synchronizer performing a correlation operation between a reception data stream and a preamble to output a synchronous signal indicating the start of a frame and reception data synchronized with the synchronous signal with respect to each frame, and then stopping the correlation operation when a maximum value among correlation values is observed periodically at the same location; and a despreader computing correlation values between spreading codes and a reception data stream synchronized with the synchronous signal, and outputting an index value selecting a spreading code corresponding to a maximum value of the correlation values as demodulated data.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings. Moreover, detailed descriptions related to well-known functions or configurations will be ruled out in order not to unnecessarily obscure subject matters of the present invention.

Common communications systems need to synchronize data frames in terms of both time and frequency and also need to estimate channel parameters and noise variations. For such synchronization and estimation, preamble sequences are used, which may also be referred to as training symbols or training sequences.

A preamble is a signal used for synchronizing transmission timing between more than two systems in network communications. Proper timing ensures that all systems accurately interpret the beginning of an information transfer.

Figure 1:
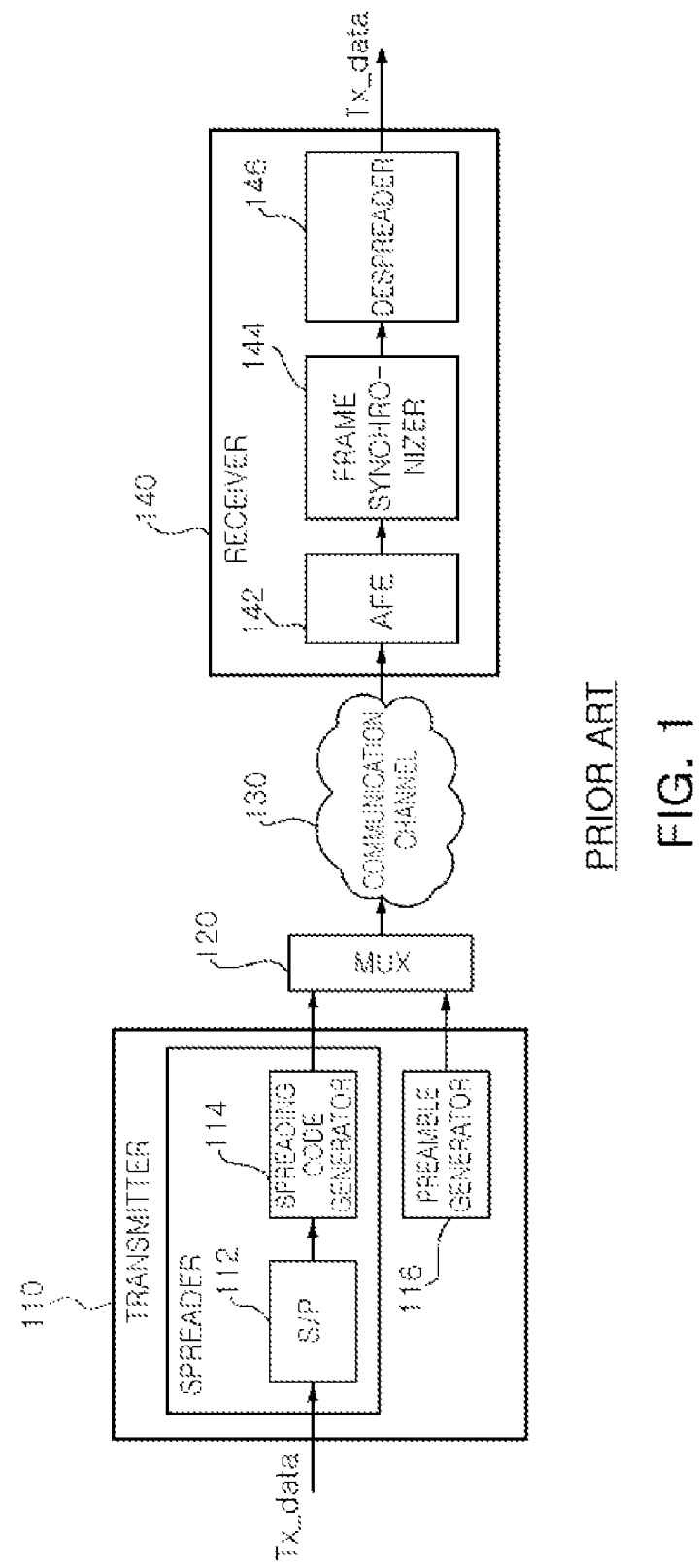
FIG. 1 illustrates the configuration of a transceiver for a communication modem, which transmits and receives data by the related art spreading method.
Figure 2:
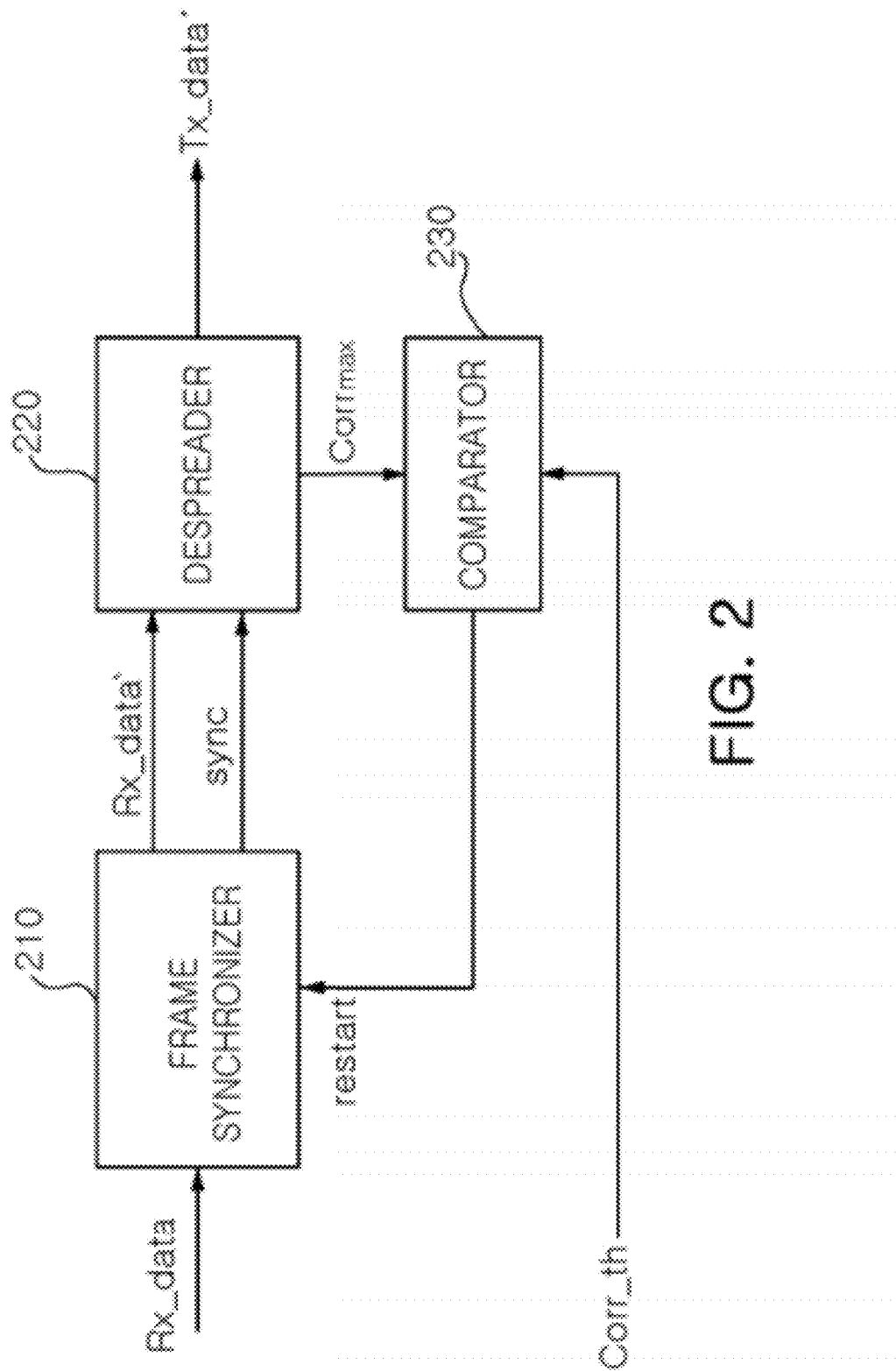
FIG. 2 is a block diagram of a receiver for a communication modem, according to an exemplary embodiment of the present invention.

FIG. 2 is a block diagram of a receiver for a communication modem, according to an exemplary embodiment of the present invention.

Referring to FIG. 2, a receiver for a communication modem, according to this embodiment, includes a frame synchronizer 210, a despreader 220 and a comparator 230. The receiver for a communication modem may further include an analog front end (AFE) (not shown) that performs clock synchronization on input reception (Rx) data and compensates for distortion and removes noise through filtering.

The frame synchronizer 210 performs a correlation operation between a reception data stream and a preamble, and outputs a synchronous signal sync indicating the start of a frame and a reception data RX_data' synchronized with the synchronous signal sync. In detail, the frame synchronizer 210 computes correlation values between the reception data stream and the preamble, and outputs a synchronous signal sync based on the location of a maximum value among the computed correlation values.

The despreader 220 computes correlation values between spreading codes and the reception data stream synchronized with the synchronous signal, and outputs an index value selecting a spreading code corresponding to the maximum value of the correlation values as transmission data Tx_data', demodulated data. Here, the spreading code represents a signal for despreading the spread band of reception data, and the despreader 220 may despread reception data by the use of a spreading code and thus restore data, distorted by noise, interference and signal disturbance, to an original state.

The comparator 230 compares a maximum value $Corr_{max}$ computed by the despreader 220 with a preset threshold value Corr_th. When the maximum value $Corr_{max}$ is smaller than the preset threshold value Corr_th, frame synchronization is determined to have failed (out-of-sync state) and is restarted. That is, when the maximum value $Corr_{max}$ is smaller than the threshold value Corr_th, the comparator 230 transmits a restart signal 'restart' for restarting a correlation operation to the frame synchronizer 210.

Figure 3:
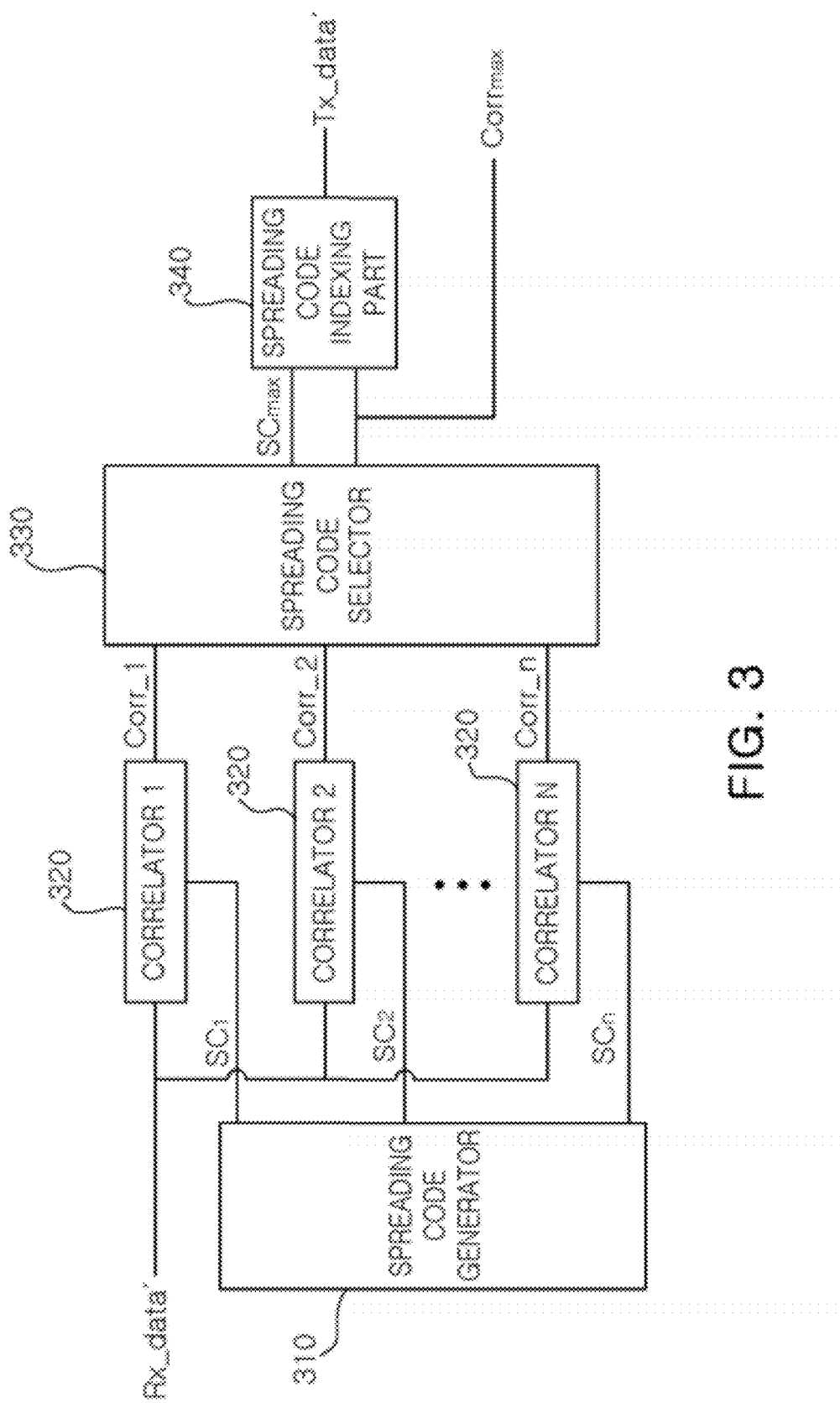
FIG. 3 illustrates the internal structure of a despreader according to an exemplary embodiment of the present invention.

FIG. 3 illustrates the internal structure of a despreader according to an exemplary embodiment of the present invention.

Referring to FIG. 3, the despreader 220 according to this embodiment, includes a spreading code generator 310, a plurality of correlators 320, a spreading code selector 330, and a spreading code indexing part 340.

The spreading code generator 310 generates spreading codes SC1, SC2, ... and SCn required for the correlation operations of the plurality of correlators 320.

When frame synchronization is acquired by the frame synchronizer 210, the plurality of correlators 320 compute correlation values between the respective spreading codes and a reception data stream synchronized with a synchronous signal.

The spreading code selector 330 searches for a maximum value $Corr_{max}$ among correlation values Corr_1, Corr_2, ..., and Corr_n computed from the correlation operations, and selects a spreading code $SC_{max}$ corresponding to the maximum value $Corr_{max}$.

The spreading code indexing part 340 outputs an index value selecting the spreading code $SC_{max}$ as demodulated data Tx_data'.

Figure 4:
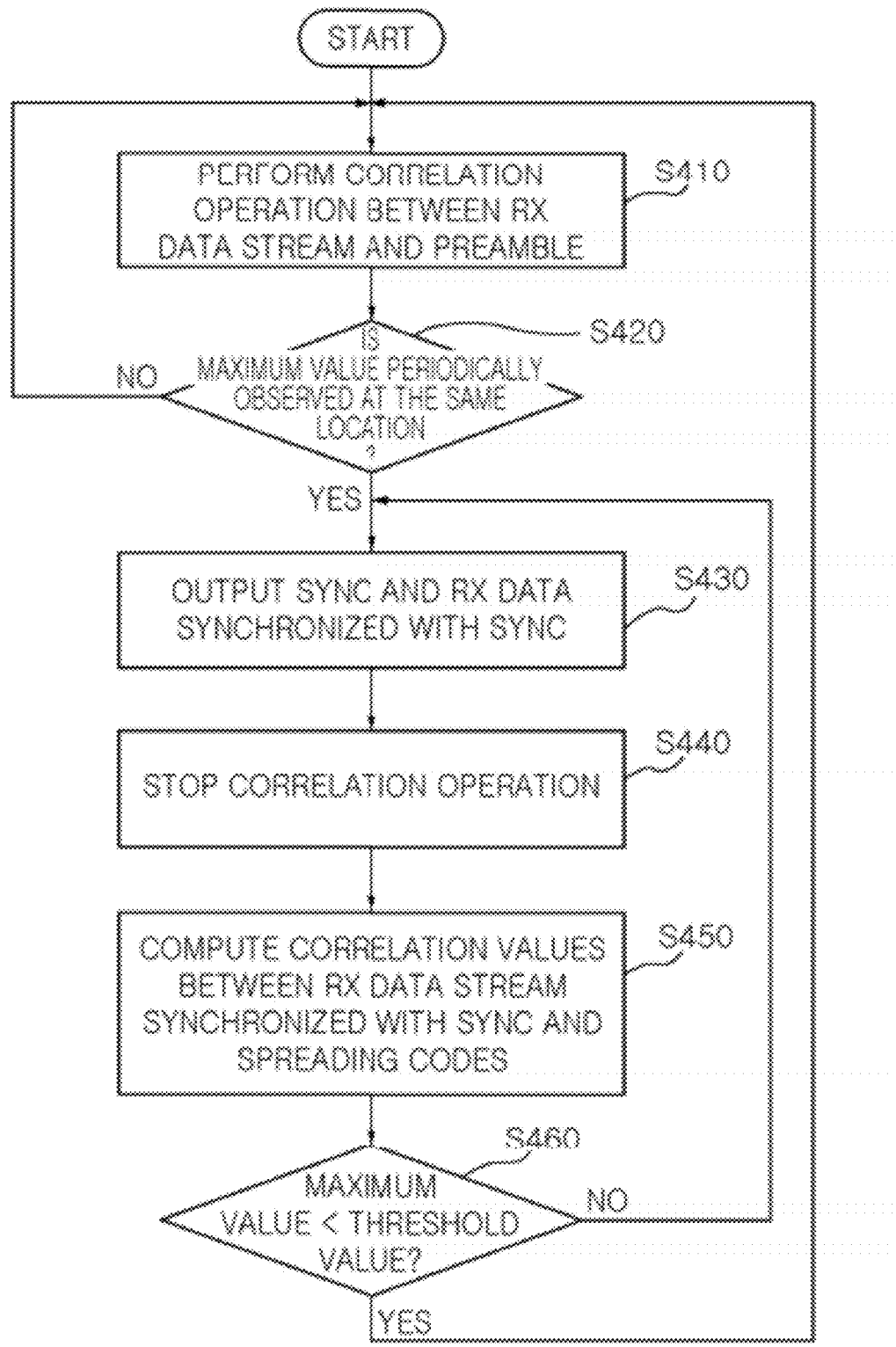
FIG. 4 is a flowchart illustrating a frame synchronization method according to an exemplary embodiment of the present invention.

FIG. 4 is a flowchart illustrating a frame synchronization method according to an exemplary embodiment of the present invention.

Referring to FIG. 4, in operation S410, the frame synchronizer 210 computes correlation values between reception data and a preamble whenever reception data is input.

In operation S420, the frame synchronizer 210 determines whether the maximum value of the correlation values is observed periodically at the same location.

When the maximum value is observed periodically at the same location, the frame synchronizer 210 converts to a synchronization acquisition mode. In operation S430, in the synchronization acquisition mode, the frame synchronizer 210 outputs a synchronous signal sync indicating the start of a frame and synchronized reception data periodically with respect to each frame. In operation S440, the frame synchronizer 210 stops computing the correlation values.

In operation S450, the despreader 220 computes correlation values between the synchronized reception data stream and spreading codes.

In operation S460, the comparator 220 compares the maximum value of the correlation values computed in operation S450 with a threshold value. When the maximum value is smaller than the threshold value, the comparator 220 determines frames to be out of sync and the process flow goes back to the operation S410 so that the frame synchronizer 210 re-computes correlation values.

As set forth above, according to exemplary embodiments of the invention, the out-of-sync state of frames is detected by using a correlation value computed by the despreader which performs data demodulation, instead of performing the continuous correlation operation in the frame synchronizer. Accordingly, the operation quantity of the frame synchronizer can be reduced, and a frame synchronization method proper for hardware implementation can be provided.

While the present invention has been shown and described in connection with the exemplary embodiments, it will be apparent to those skilled in the art that modifications and variations can be made without departing from the spirit and scope of the invention as defined by the appended claims.

What is claimed is:

1. A frame synchronization method comprising:
    performing a correlation operation on a reception data stream and a preamble to output a synchronous signal and synchronized reception data;
    computing first correlation values between spreading codes and the synchronized reception data;
    comparing a maximum value of the first correlation values with a preset threshold value; and
    performing the correlation operation on the reception data stream and the preamble again if the maximum value of the first correlation values is smaller than the preset threshold value.

2. The frame synchronization method of claim 1, wherein the performing of the correlation operation comprises:
    computing second correlation values between the reception data stream and the preamble;
    determining whether or not a maximum value of the second correlation values is periodically observed at the same location; and
    outputting the synchronous signal on the basis of the location of the observed maximum value if the maximum value of the second correlation values is periodically observed at the same location.

3. The frame synchronization method of claim 1, wherein in the outputting of the synchronous signal, when the synchronous signal is outputted, the correlation operation is stopped.

4. A receiver for a communications modem comprising:
   a frame synchronizer configured to perform a correlation operation on a reception data stream and a preamble to output a synchronous signal and synchronized reception data;
   a despreader configured to compute first correlation values between spreading codes and the synchronized reception data, and output, as demodulated data, an index value of a spreading code corresponding to a maximum value of the first correlation values; and
   a comparator configured to compare the maximum value with a preset threshold value, and transmit a restart signal for restarting the correlation operation to the frame synchronizer if the maximum value is smaller than the preset threshold value.

5. The receiver of claim 4, wherein the frame synchronizer is configured to compute second correlation values between the reception data stream and the preamble, determine whether or not a maximum value of the second correlation values is periodically observed at the same location, and output the synchronous signal on the basis of the location of the observed maximum value if the maximum value of the second correlation values is periodically observed at the same location.

6. The receiver of claim 4, wherein the frame synchronizer is configured to stop performing the correlation operation when the synchronous signal is outputted.

7. The receiver of claim 4, wherein the despreader comprises:
   a spreading code generator configured to generate the spreading codes;
   a plurality of correlators configured to compute the first correlation values between the spreading codes and the synchronized reception data;
   a spreading code selector configured to select the spreading code corresponding to the maximum value of the first correlation values; and
   a spreading code indexing part configured to output, as the demodulated data, the index value of the selected spreading code.

* * * * *